ATTACHMENT FOR PATTERN TRACING MACHINE

Filed June 19, 1963 2 Sheets-Sheet 1

INVENTOR.
ANTHONY P. ARNO
BY
Spencer E. Olson
ATTORNEY

ATTACHMENT FOR PATTERN TRACING MACHINE
Filed June 19, 1963
2 Sheets-Sheet 2
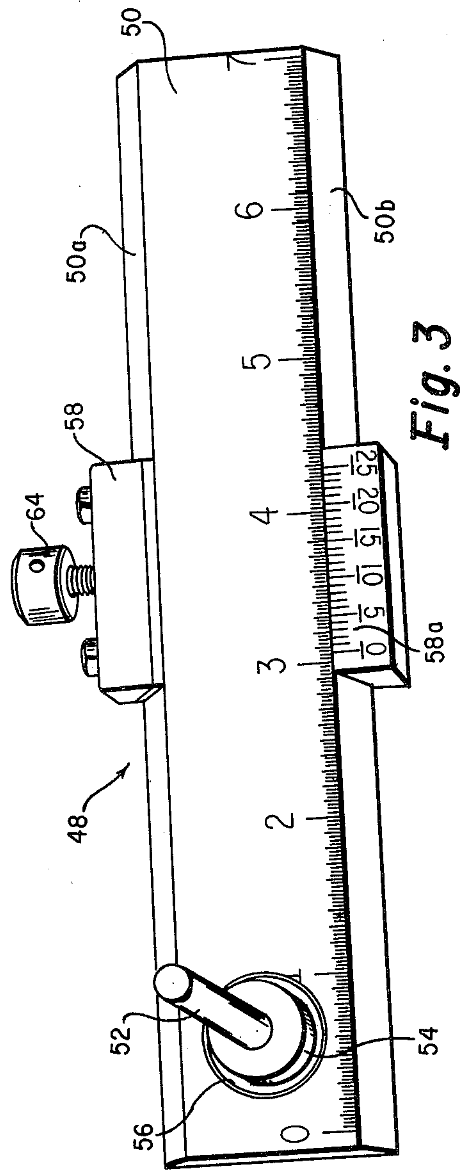
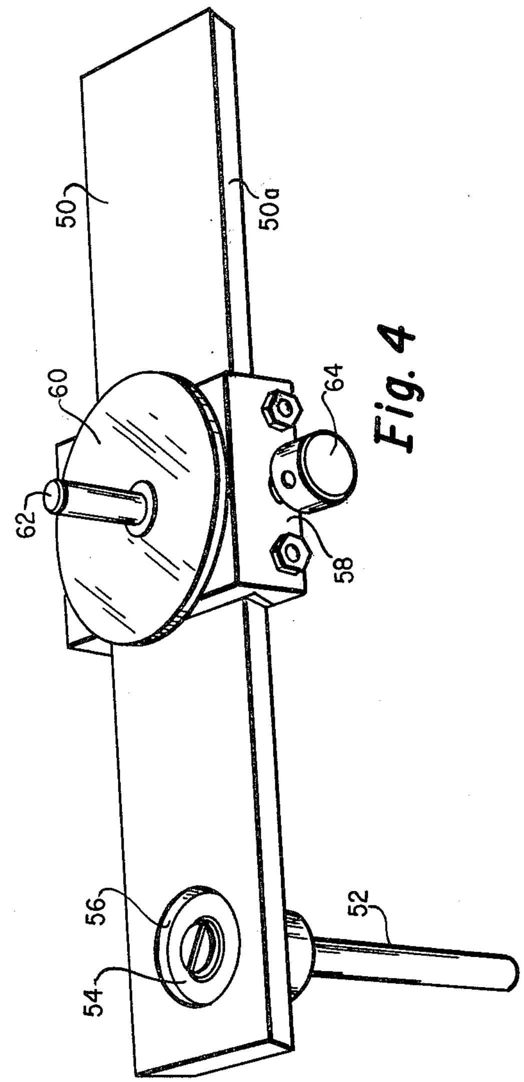
INVENTOR.
ANTHONY P. ARNO
BY
Spencer E. Olson
ATTORNEY United States Patent Office 3,177,586

Patented Apr. 13, 1965

3,177,586
ATTACHMENT FOR PATTERN TRACING MACHINE

Anthony P. Arno, 12 Brookline St., Watertown, Mass.

Filed June 19, 1963, Ser. No. 289,032
1 Claim. (Cl. 33—23)

This invention relates generally to machines for forming patterns from a master pattern, and more particularly to an attachment for machines of this type to give them a drilling and milling capability. More specifically, the invention is concerned with an attachment for a pantograph engraving machine.

Machines of this type include a cutting tool rotatable about a vertical axis, a work table for supporting the workpiece in which the pattern is to be cut, a copy table for supporting a master pattern or template, a tracer or stylus adapted to be moved to follow the master pattern, and a pantograph or other motion duplicating mechanism operable by movement of the stylus to cause the cutting tool to cut or rout a corresponding pattern in the workpiece. When used for engraving, the master is usually formed of flat brass stock in which V-grooves are cut to define the pattern and in which the stylus is placed to trace out the design. Manufacturers of machines of this type make and sell a wide variety of templates for standard and special signs, symbols and patterns, such as letters for monograms, electrical symbols, letters and numerals of different styles, etc., and, of course, the user may prepare his own pattern or template to reproduce a particular design or pattern.

In general, machines of this type have heretofore been used almost exclusively for the cutting or grinding of irregular shapes or patterns which are not readily performed by other machines. It has been recognized, however, that it may be employed for engraving circles or cutting circular holes; for example, masters consisting of graduated circles are commercially available. It will be apparent, however, that the sizes of holes one can cut using such a template would be limited to those available on the template, and to achieve a capability of cutting a hole of any desired size would require a large number of templates and/or the use of one such template and adjustment of the ratio of the pantograph mechanism to cause the cutting tool to circumscribe a circle of the exact diameter desired. Either approach is costly or inconvenient and would make difficult the cutting of holes to close tolerances.

It is a general object of the present invention to increase the versatility of a pantograph pattern tracing machine.

A more specific object of the invention is to convert a pantograph engraving machine or the like into a precision drill press capable of cutting a hole of any desired size with a high degree of accuracy.

Another object of the invention is to provide a pantograph type of machine with the foregoing capabilities by simple and inexpensive means.

Briefly, these objects are achieved by a simple, readily removable attachment for a pantograph machine which provides a radius arm of accurately controllable length from a fixed point on the copy table of the machine for defining the radius of the circle circumscribed by the stylus of the machine. The attachment consists of a bar on which a precision rule is engraved, a block in which the bar is slidably received and on which a scale, adjacent the scale on the bar, is engraved to provide a vernier scale, a first spindle secured to the block and adapted for pivotal engagement with a fixed point on the copy table, and a second spindle rotatably secured to one end of the bar and adapted to replace the usual stylus of the pantograph machine. Thus, the first spindle locates the center of a compass, of which the second spindle is the stylus, which constrains the tracer arm of the pantograph mechanism to follow a circle having a radius equal to the distance between the two spindles, thereby causing the cutting tool to cut a hole of like (or proportional) radius in a workpiece. By virtue of the vernier scale, the radius can be set to any desired value, with an accuracy of .001" with ease, permitting any size hole to be cut in the workpiece with at least the same accuracy. The hole size can be quickly and easily changed, giving the machine a drill press capability of an infinite number of drills of different sizes, and at much lower cost.

Other objects, features and advantages of the invention, and a better understanding of its construction and operation, will be apparent from the following detailed description read in conjunction with the accompanying drawings, in which:

FIG. 3 is a top perspective view of the vernier compass of the invention disassembled from the pattern tracing machine; and FIG. 4 is a perspective view of the vernier compass as viewed from the underside.

Figure 1:
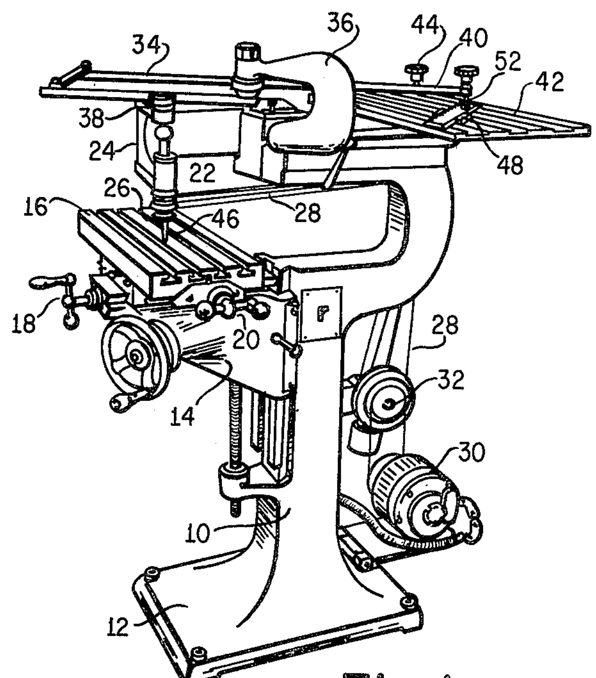
FIG. 1 is a perspective view of a pattern controlled reproducing machine of the manually actuated pantograph type in which the attachment of the invention is incorporated.

Referring now to FIG. 1, the pantograph controlled machine with which the invention has particular utility includes a main frame or column 10 extending upwardly from and supported on a base 12, with a vertically adjustable knee or other support 14 located at the forward side of the column 10 on which a work table 16 is adjustably mounted for movement in two directions under control of hand cranks 18 and 20.

A vertically disposed cutter head 22 is mounted and carried by a swingable pivoted link supporting structure 24, which structure extends forwardly from the upper end of the main frame 10 with the cutter head 22 positioned above the work table 16 for universal lateral movement over and above the work table. In this instance the machine is adapted for cutting, and the cutter head 22 includes a high-speed, rotary spindle 26 journalled therein. The spindle is of the type adapted to be driven by a cord belt 28 driven by a suitable motor 30 through a speed-changing pulley 32.

The cutter head assembly 22 is moved by a pantograph motion reproducing mechanism 34 mounted on and supported from a horizontally disposed arm 36 which is supported from the upper end of the main column 10. The pantograph is pivotally coupled at 38 with the link structure 24, so that moving the pantograph 34 will, in the usual manner, correspondingly move the link 24 and the cutter head 22 laterally in a horizontal plane in accordance with the lateral, horizontal motion transmitted thereto by the pantograph.

The pantograph 34 includes a stylus carrying arm 40 for moving the pantograph, this arm normally carrying at its rear free end a stylus which is positioned above a pattern or copy supporting table 42 mounted horizontally on the upper end of the main frame 10. The stylus carrying arm 40 is provided with a suitable operating knob 44 through the medium of which the operator manually moves the stylus to follow the profile surface of a pattern or template (not shown) mounted and secured on the copy table 42.

The pantograph 34 is of the adjustable type so that it may be set for full scale duplication in the workpiece of a pattern, or for scale reductions of a pattern. For example, it may have ratios ranging from full scale, or 1:1 reproduction, or reduced reproduction say down to 10:1, as will be understood by those familiar with machines of this kind. It will be seen hereinafter that this feature of the pantograph may be used to advantage to improve the accuracy of the attachment of the invention.

As the machine is adapted (as will be more clearly seen hereinafter) for a hole cutting or drilling operation, a suitable cutting tool 46 is provided in spindle 26, being held therein by a suitable chuck. Such cutting tool may, for example, include a cylindrical cutting surface, which, for the cutting of very small holes, may be as small as .050" in diameter. The spindle 26 includes means for manually imparting vertical movement to the cutting tool, usually over a range of about ¼" to ½".

In the adaptation of the machine for the cutting of holes of accurately controlled size, the workpiece is mounted and secured on the work table 16 of the machine. Instead of the usual pattern or template, the motion of the cutting tool relative to the workpiece is controlled, according to the invention, by a vernier compass 48 pivotally joined at one point thereon to a fixed point on the copy table 42 usually the "zero" point, and pivotally joined at another point thereon to the free end of the tracer arm 40 in the opening where the tracing stylus is normally carried.

Figure 2:
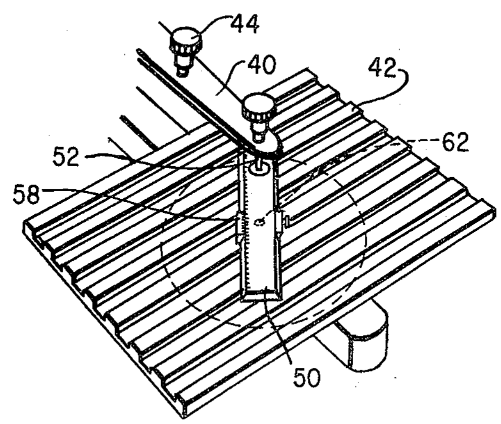
FIG. 2 is an enlarged perspective view of the copy table of the machine of FIG. 1 showing the vernier compass of the invention in operative relationship with the copy table and tracer arm of the pantograph mechanism.

Referring to FIGS. 2, 3 and 4, the vernier compass attachment comprises an accurately machined enlongated flat bar 50, preferably formed with bevelled side edges **50*a* and 50*b*. The bar 50 may be formed of steel and is of a length determined by the maximum size of the hole it is desired to cut; in the disclosed embodiment, the bar is slightly over seven inches long. Along one edge of the bar, in this case, edge 50*b*, a seven inch rule is accurately engraved, in the present case, graduated to 0.025". Near one end of the bar, at a point about 0.7" in from the zero point on the rule, a spindle 52 is rotatably journalled in a bearing 54 carried in an opening 56 in the bar. The spindle is positioned normal to the bar 50, and as is best seen in FIG. 4, the bearing 54 does not extend completely through the thickness of the bar. The spindle 52 is sufficiently long and is of a diameter to be received in the opening in the free end of tracer arm 40 of the pantograph 34 where the stylus is normally carried. Mounted on the bar 50 and slidable therealong is a carefully machined block 58 having a channel therein equal in width to the bar and conforming to the bevelled side edges 50*a* and 50*b*. The upper side of the channel (as viewed in FIG. 3) is open and of a width equal to the flat surface of bar 50, the upper surface of the block lying in the plane of the upper surface of the bar. A circular plate 60 is secured to the underside of block 58, to which, in turn, is secured a second spindle 62 which depends perpendicularly from the center of plate 60. Spindle 62 is of a length and diameter to be received in a hole located centrally of the copy table 42 of the machine of FIG. 1, known as the "zero" point of the table, the plate 60 providing a flat bearing surface for engagement with the upper surface of the copy table and clearance between the bar and table to allow the bar to be swung about spindle 62** in a plane parallel to the upper surface of the copy table.

The upper surface of block 58 is engraved along the edge adjacent the rule on bar 50 with accurately spaced graduations **58*a* to provide, in conjunction with the rulings on the bar, a vernier scale in a manner well known to the art. The scale 58*a* on the block is so positioned relative to spindle 62 that when its "0" is aligned with the "0" on the bar, the axes of spindles 52 and 62 are co-linear. The block 58 may be locked at any desired position along the bar 50 by a thumb screw 64 threaded in a sidewall of the block and extending into the channel therein to engage side edge 50*a*. Thus, the distance between spindles 52 and 62** (the radius of the compass) can in the present case be adjusted to any value between zero and about six and one-half inches to an accuracy of at least 0.001". And, if the ratio of the pantograph is adjusted to, say 10:1, the radius of the circle cut in the workpiece is accurate to ten times this figure, or to 0.001".

As best seen in FIG. 2, the vernier compass is assembled on the copy table with the spindle 62 extending into the "zero" opening in the table and the spindle 52 positioned in the stylus opening at the free end of the stylus arm 40. Thus, when the operator by grasping knob 44 manually moves the arm 40, the spindle 52 traces a circle whose center is located by the aforesaid opening in the copy table and whose radius is the setting of the vernier scale. This circular motion of the tracer arm is transmitted by the pantograph 34 to the link structure 24 to correspondingly move the cutting tool 46 in a horizontal plane. If vertical motion is imparted to the cutting tool while the vernier compass 48 is rotated about spindle 62, the tool will cut a hole in the workpiece of a radius equal to that set on the compass for a 1:1 ratio of the pantograph, or of a selected smaller radius determined by the ratio setting. The size of the hole to be cut can be quickly changed by adjusting the position of the block 58 on the bar 50, or the ratio of the pantograph, or both. Using a cutting tool of sufficiently small (yet practical) diameter, it is possible to cut any size hole, using the same cutter, from about 1/16" to 12" in diameter to an accuracy of 0.001" with ease. Thus, this attachment gives a pantograph engraving machine a drill press capability of an infinite number of drills of different sizes, and at much lower cost.

It will now be recognized by ones skilled in the art that the described attachment also permits facing and milling operations to be performed on an engraving machine. That is, with the vernier compass 48 set to define a selected circle of movement of the cutting tool, a workpiece may be faced off, or a slot milled therein, by moving the work-supporting table horizontally relative to cutter.

While there has been shown and described what is now considered a preferred embodiment, variations and modifications can now be made by ones versed in this art without departing from its true spirit and scope. Obviously, the attachment can be used on pantograph machines of types other than the one selected for describing the invention, and such modifications as may be necessary to adapt it to such other machines are considered to be within the scope of the invention. In this connection, holes other than the "zero" opening usually found in the copy table may be provided for receiving spindle 62, or a plate having suitably placed openings for selectively locating the center of the circle to be traced may be secured to the copy table. Likewise, the bar 50 and slidable block 58 need not be of the exact construction shown, it being within the contemplation of the invention to provide a thumbscrew adjustment for positioning the block 58 after the manner of available vernier calipers. Also, although the bar 50 has been shown as decimally graduated along one edge thereof, it may be found convenient to provide another scale along the other edge **50*a*, graduated in sixty-fourths, for example, and co-operating vernier markings on the surface of block 58** adjacent thereto. Accordingly, it is applicant's intention that the invention not be limited by what has been specifically illustrated and described except as such limitations appear in the appended claim.

What is claimed is:

An attachment for a pantograph pattern tracing machine including a pattern holding table having an opening therein and a tracer arm mounted for movement over said table and having a stylus-receiving opening therein, for causing the stylus-receiving opening of the tracer arm to describe a circle of selectively adjustable radius about the opening in the table as the center, said attachment comprising, an elongated flat bar having graduated rulings along an edge thereof, a first spindle pivotally connected to said bar near one end thereof by a bearing having an axial dimension less than the thickness of said bar, said first spindle extending normally to the plane of said bar from the upper surface thereof and adapted for engagement by the stylus-receiving opening in said tracer arm, a block having a channel therein in which said bar is received for movement to selected positions relative to the block, said block having graduated rulings thereon cooperatively arranged with the rulings on said bar whereby the position of said block on said bar may be set with vernier accuracy, a circular plate secured to the underside of said block for providing a smooth bearing surface for engagement with said table, a second spindle dimensioned to be received by the opening in said table depending from the center of said circular plate in direction parallel and opposite to said first spindle, and means for releasably securing said block to said bar at the position selected, the channel in said block being open at the upper side of said block to allow said block to be adjusted to a position on said bar where said first and second spindles are co-linear.

References Cited by the Examiner

UNITED STATES PATENTS

| | | | |
|---|---|---|---|
| 1,256,461 | 2/18 | Foster | 33—27 |
| 2,371,048 | 3/45 | Hayes | 33—27 |
| 2,642,660 | 6/53 | De Vau et al. | 33—23 |

ISAAC LISANN, *Primary Examiner.*